Figure 1:
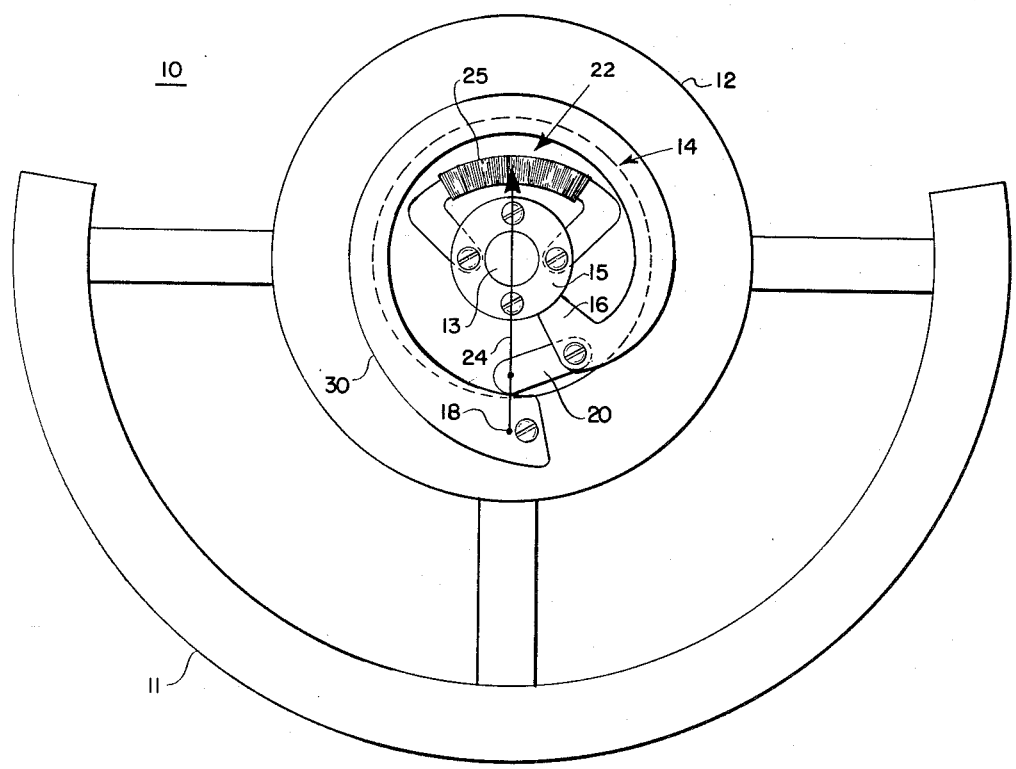

Aug. 28, 1956

L. E. ALBERTS
AUTOMATIC PILOTS 2,761,100

Filed Oct. 25, 1951

2 Sheets—Sheet 1

INVENTOR.
LAWRENCE E. ALBERTS

BY
George H Fisher

ATTORNEY

INVENTOR.
LAWRENCE E. ALBERTS
BY George H Fisher
ATTORNEY

United States Patent Office 2,761,100
Patented Aug. 28, 1956

2,761,100

AUTOMATIC PILOTS

Lawrence E. Alberts, Minneapolis, Minn., assignor to Minneapolis-Honeywell Regulator Company, Minneapolis, Minn., a corporation of Delaware Application October 25, 1951, Serial No. 253,103

20 Claims. (Cl. 318—489)

The present invention pertains to aircraft attitude control systems wherein the attitude of the craft about an axis thereof is adjusted by a manually operable controller which operates through the automatic pilot of the aircraft. The manual controller thus operates through a motor to position a control surface forming an arrangement termed a power boost arrangement.

An object of the present invention is to provide a novel arrangement to control attitude of an aircraft from the conventional control column of the aircraft operating through the automatic pilot of the craft.

A further object of this invention is to provide an improved power boost system wherein the force on the manually operable controller determines the rate of operation of a control surface of an aircraft.

A further object of this invention is to provide an improved boost system wherein a manually operated controller causes operation of a control surface at a rate proportional to the force applied to said controller.

Another object of this invention is to cause operation of a control surface of an aircraft in accordance with a force exerted between the pilot's control wheel of an aircraft and the control surface servomotor.

A further object of this invention is to provide a manually operable boost system having an effect proportional to the time integral of a manual control signal in conjunction with the autopilot of an aircraft wherein said autopilot functions to return said aircraft to its original attitude upon removal of said manual control signal during the existence of the time integral of said signal.

Another object of the invention is to provide a novel manually operable controller effective through the automatic pilot of the aircraft to cause the rate of change of attitude of the aircraft to be proportional to the manual effort applied.

The above and further objects of the invention will become apparent hereinafter from the following description referring to the accompanying drawing. The novel features of the invention will be more clearly pointed out in the claims annexed to and forming part of the description.

In the present arrangement, an electrical signal generator has an output signal which varies with the magnitude of the torque or effort applied by the pilot of an aircraft to the wheel mounted on the conventional craft control column. The magnitude of this signal determines the speed of rotation of a control motor. The control motor adjusts a signal generator for producing a variable voltage signal in a balanceable electrical network of an automatic pilot. This signal increases with the speed and duration of operation of said control motor. In other words the rate of increase of this signal depends upon the manual effort applied to the control wheel. As the control motor departs from a normal position, it renders an automatic heading stabilizing device ineffective in said network. As the voltage from the control motor operated signal generator increases, an aileron servomotor is operated by the rebalanceable network to position the aileron control surfaces proportional to the unbalance in said network and to operate a follow-up signal generator in said network. The operated ailerons cause the craft attitude to change about the roll axis. The aileron servomotor displaces the ailerons at a speed or rate proportional to the control wheel effort since its speed is a function of the magnitude of unbalance of the network.

The control surface is positioned an amount proportional to the magnitude of the voltage of the signal generator and at a rate proportional to the rate of increase of the voltage in said generator. This signal voltage evidently depends upon the magnitude of the manually applied torque on the control column and the duration of its application. Thus the amount of surface displacement through the control surface motor is the same as would be obtained from direct manual operation of the control surface—that is, it depends upon the magnitude and duration of the control wheel effort.

When the craft reaches the desired bank attitude, the pilot no longer applies torque to the control wheel. The control motor now ceases rotation but the voltage generator remains adjusted. An electrical voltage proportional to the craft bank attitude opposes the control motor adjusted generator voltage and the ailerons are therefore caused to return to normal position by the servo which removes the follow-up generator voltage to keep the network balanced so the ailerons are in unoperated position as during direct manual operation of the ailerons when manual effort on the wheel is removed.

To return the craft to the original bank attitude, the pilot operates the control wheel in the reverse direction and causes the control motor to reversely operate thereby reducing the voltage on the control motor adjusted signal generator. The bank attitude voltage, since it now exceeds the control motor adjusted generator voltage, effects reverse operation of the ailerons to reduce craft bank.

When the craft bank attitude is within 5 degrees of the original attitude, as evident for example on an indicating gyroscope, the pilot releases the effort on the wheel. A control motor reset voltage generator connected to the control motor for control thereof within a five degree range from original attitude but not at the original attitude effects return of the control motor to its original position.

The ailerons in the said craft are now primarily under control of the bank attitude voltage, and the craft is returned automatically to its normal position following the release of the control wheel effort within the above mentioned five degree range. The automatic heading control device is now no longer rendered ineffective with the craft in normal bank attitude and automatic heading control is resumed.

Figure 2:
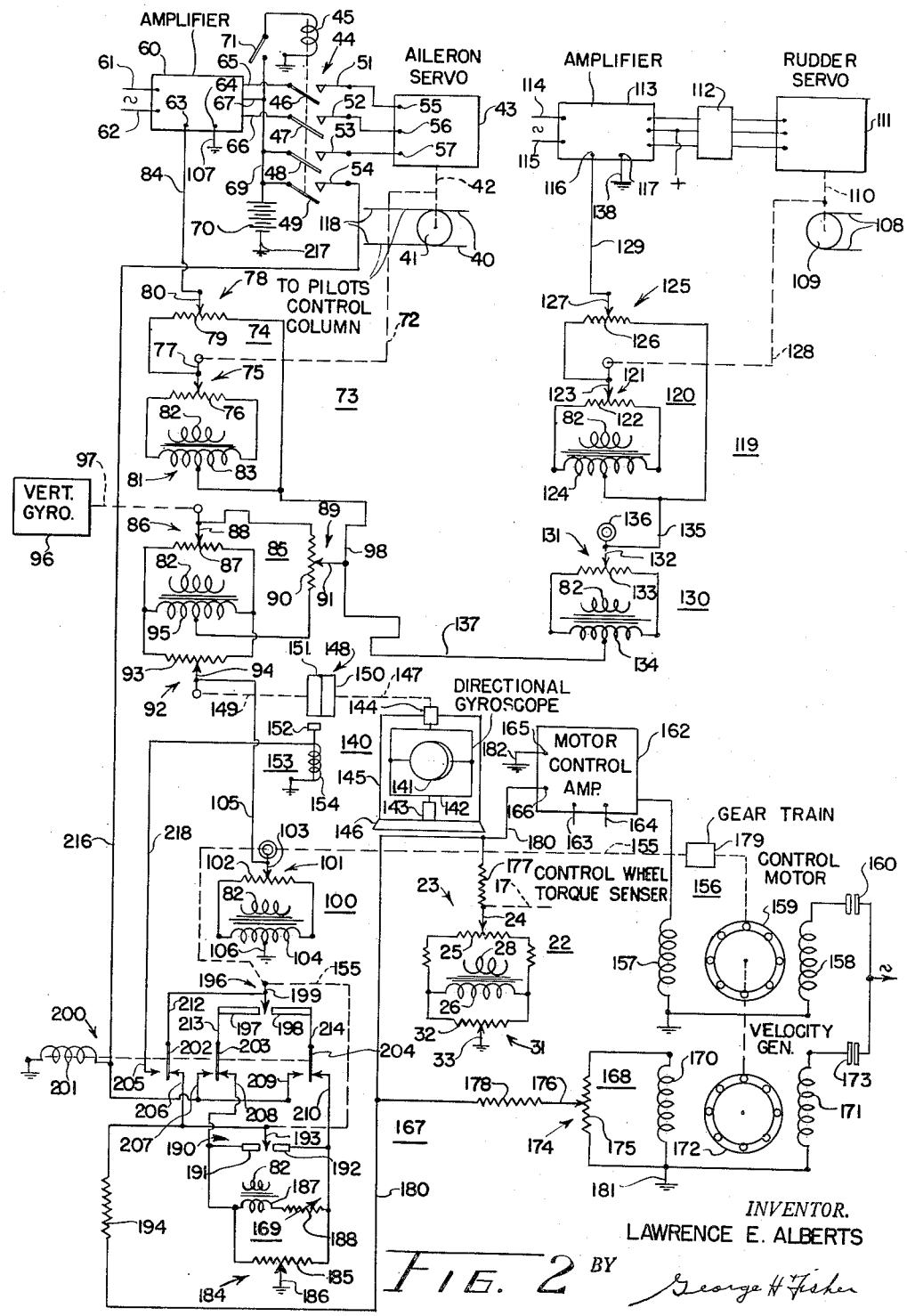

For a better understanding of the means whereby the objects of the invention are realized, the following detailed description of the arrangement may be considered in conjunction with the accompanying drawing wherein:

Figure 1 is a schematic showing of the conventional control wheel of an aircraft incorporating the novel controller; and Figure 2 is a schematic view of the novel controller associated with two channels of the automatic pilot to control the ailerons and rudder thereof.

Referring to Figure 1, a manually operable controller or signal generator 10 consists of the conventional manually operable pilot's control wheel or member 11 in the pilot's cockpit which has its hub 12 related to a main control drive spindle 13 on the conventional control column by a resilient spring member 14. The spring member in the present arrangement consists of an inner circular portion 15 concentric with an outer circular or spiral portion 30. The circular portion and one end of the spiral portion are physically connected by a radial portion 16. The portion 15 is secured to the main control drive spindle 13, and the portion 30 is secured to the hub 12 of the control wheel 11. Pivoted at 18 to the portion 30 adjacent its connection with hub 12 is a potentiometer slider 24. Extending from the slider 24 is an operating link 20 pivoted also on the radial portion 16. It will be evident that the spring member 14 as it is strained transfers torque from the wheel 11 to the spindle 13 and resistance to this torque is reflected by relative movement of the outer portion 30 and radial portion 16 to effect rotation of slider about its pivot 18. Associated with slider is a potentiometer resistor 25 of electrical signal generator 22. Signal generator 22 thus comprises a potentiometer 23 having a slider 24 secured to portion 30 and a resistor 25. The resistor 25, Figure 2, is connected across the ends of a secondary winding 26 of a transformer 27 having a primary winding 28. The primary winding is connected to a source of alternating current of 400 cycle frequency. The resistor 25 and transformer 27 may be secured to the spindle 13 of the pilot's control column. The generator 22 develops a voltage signal proportional to the torque applied to control wheel 11 by the pilot.

Figure 2 also includes the control wheel torque signal generator in association with an automatic pilot for controlling the ailerons and rudder of an aircraft. The aileron control surfaces (not shown) have main control cables 118 which are operated by cables 40 affixed thereto and extending from a cable drum 41 fixed to an output shaft 42 of an aileron servomotor 43. The cables 118 are conventionally operatively connected to spindle 13. The aileron servomotor 43 is reversibly controlled through an aileron engage relay 44 from an aileron servomotor amplifier 60. The aileron amplifier 60 is of the A. C. discriminator type and alternatively energizes one or another clutch winding in the servomotor 43 to reversibly control its rotation depending upon the phase relationship of an input control signal to an alternating power signal. The engage relay 44 comprises an operating winding 45 for relay arms 46, 47, 48 and 49 which coact respectivley with in contacts 51, 52, 53 and 54. Contact 51 is connected to one clutch winding terminal 55 of servomotor 43, contact 52 is connected to another clutch winding terminal 56 and contact 53 is connected to brake winding terminal 57 of motor 43. Amplifier 60 comprises a pair of power input connections 61, 62 connected to the 400 cycle 115 voltage supply; a pair of input signal terminals 63, 64; D. C. output connections 65, 66 connected respectively to relay arms 46 and 47. D. C. output connections 65, 66 are alternatively connected to D. C. input lead 67 through a pair of relays in amplifier 60 which are operated in discriminator fashion depending upon the relationship of the A. C. signal voltage across signal input terminals 63, 64 relative to the 400 cycle supply voltage across input connections 61, 62.

The amplifier servomotor combination may be similar to that disclosed in the patent to Willis H. Gille et al. 2,425,733, dated August 19, 1947, or as shown in a patent to Hamby 2,466,702, dated April 12, 1949. As disclosed in the aforesaid patent to Willis H. Gille et al., the amplifier D. C. output leads 65, 66 are alternatively energized. Also such energized lead may be intermittently or continuously energized depending upon the magnitude of the input signal to amplifier terminals 63, 64. With a small input signal, the conductor is intermittently energized whereas if the signal is large the conductor or output lead is continuously energized. Thus one or the other of the clutch windings of servomotor 43 may be intermittently or continuously energized so that the extent of rotation of output shaft 42 in any time interval depends upon whether the clutch winding is intermittently or continuously energized.

The amplifier D. C. input connection 67 extends from a D. C. bus 69 energized from a 28 volt D. C. supply such as a battery 70. A manually operable single pole single throw switch 71 serves to connect operating winding 45 of relay 44 with the bus 69. Relay arms 48 and 49 are also connected to the bus 69.

Aileron amplifier control signals are derived from balanceable network 73 comprising a servo balance network 74, a bank attitude-heading deviation network 85, and a manual turn control network 100. Network 74 comprises a servo balance potentiometer 75, a ratio potentiometer 78, and a transformer 81. Potentiometer 75 includes slider 77 and a resistor 76 which is connected across a secondary winding 83 of transformer 81 which has a primary winding 82. The primary winding is energized from the 115 volt 400 cycle supply. Slider 77 is adjusted along resistor 76 by a suitable operating connection 72 extending from the shaft 42 of servomotor 43. Potentiometer 78 includes a resistor 79 having one end connected to slider 77 and its opposite end connected to a center tap of secondary winding 83 and a manually adjustable tap 80 having a conductor 84 extending therefrom to amplifier input terminal 63.

Network 85 comprises a bank potentiometer 86, a heading deviation potentiometer 92, and transformer 81. Since a single primary winding of a transformer may supply a plurality of secondary windings a common primary winding is indicated in the several networks. Potentiometer 86 includes a resistor 87 connected across a secondary winding 95 of transformer 81 and a slider 88 positioned along resistor 87 from a vertical gyroscope 96 in accordance with the bank angle of the aircraft through a suitable operating connection 97. The vertical gyroscope 96 is of a type well known in the art in which a rotor is mounted in a casing for rotation about a vertical spin axis with the casing in turn being carried in cross gimbals for rotation about two respectively horizontal axes. Servo means (not shown) are provided for maintaining the spin axis perpendicular to the surface of the earth. Potentiometer 92 comprises a resistor 93 connected across the secondary winding 95 in parallel with resistor 87 and a slider 94 whose operating means will be described subsequently. Network 85 includes a ratio potentiometer 89 having a resistor 90 connected across slider 88 and a center tap of secondary winding 95 and a manually adjustable tap 91. Slider 91 may be positioned along resistor 90 to select any ratio of the voltage developed between slider 88 and the center tap of secondary winding 95. A conductor 98 extends from adjustable tap 91 to the center tap of secondary winding 83 of network 74.

Network 100 comprises a turn control potentiometer 101 having a resistor 102 connected across a secondary winding 104 of transformer 81 and an adjustable slider 103 whose operating means will be described. A conductor 105 extends from slider 103 to slider 94 in network 85, and a conductor 106 extends from a center tap of secondary winding 104 to ground. Conductor 106 therefore has a common ground with amplifier ground connection 107 connected to amplifier terminal 64. The network 73 is thus connected across the amplifier terminals 63 and 64.

The rudder control surface (not shown) of the aircraft is operated by cables 108 extending from a cable drum 109 secured to an output shaft 110 of a rudder servomotor 111. The rudder servomotor 111 is reversibly controlled through a rudder engage relay 112 from a rudder servomotor amplifier 113. The rudder amplifier-servomotor combination is similar to the aileron amplifier-servomotor combination.

Amplifier 113 comprises power input connections 114, 115 energized from the 115 volt 400 cycle supply and signal input terminals 116, 117 supplied from a balanceable network 119. Network 119 comprises a servo balance network 120, a rudder trim network 130, and networks 85 and 100 in the aileron network 73. Network 120 comprises a rudder servo balance potentiometer 121, a secondary winding 124 of transformer 81, and a ratio potentiometer 125. Potentiometer 121 includes a resistor 122 connected across secondary winding 124 and a slider 123 operatively positioned by a follow-up connection 128 driven from shaft 110 of servomotor 111. Potentiometer 125 comprises a resistor 126 connected across slider 123 and a center tap of secondary winding 124 and a manually adjustable tap 127 having a lead 129 extending therefrom to amplifier input terminal 116. Network 130 comprises a rudder trim potentiometer 131 having a slider 132 and a resistor 133 which is connected across a secondary winding 134 of transformer 81. A conductor 135 extends from slider 132 to the center tap of secondary winding 124 of network 120. A manually operable knob 136 secured to slider 132 serves as an operating means therefor. A conductor 137 extends from a center tap of secondary winding 134 to manually adjustable tap 91 in network 85 to complete the input circuit to amplifier 113 through network 100 and ground conductor 106 to amplifier ground conductor 138 connected to amplifier terminal 117.

The operating means for slider 94 is a heading deviation sensing device such as a directional gyroscope 140. Directional gyroscope 140 includes a rotor (not shown) mounted in a casing 141 for rotation about a horizontal spin axis. The casing 141 is carried in a vertical gimbal ring 142 for rotation about a horizontal axis. The gimbal ring 142 in turn is carried in bearings 143, 144 for rotation about a normally vertical axis. Bearing 143 is supported on a base member 146 and the bearing 144 is supported in an inverted bail member 145 also carried by base 146. Relative angular movements of the aircraft about an axis parallel to the axis of gimbal ring 142 are transmitted by operating means 147 extending from the gimbal ring 142, friction clutch 148, and operating means 149 to slider 94.

The friction clutch 148 comprises a drive member 150 carried by operating means 147 and a driven member 151 carried by the driving means 149 of slider 94. Associated with the driven member 151 is a brake shoe 152 of a solenoid operated brake 153 whose operating winding 154 causes the engagement of the brake shoe with the circumferential surface of driven member 151 to hold it against angular movement. Any further rotation of the driving member 150 while the brake shoe 152 and driven member 151 are engaged results in slippage between the driving and driven members.

The slider 103 of the turn control potentiometer 101 is positioned along resistor 102 by means of a suitable operating connection 155 from a control motor 156. The arrangement for providing manual control of the control motor 156 will now be described.

The control motor 156 is of the capacitor induction type having field windings 157, 158 and rotor 159. Winding 158 is the line winding and is connected in series with a phasing condenser 160 to the 400 cycle 115 volt supply. The control winding 157 is energized in a modulated or regulated manner from a control motor amplifier 162. The amplifier 162 is of the A. C. discriminator type having power input terminals 163, 164 connected to a 400 cycle, 115 volt supply and signal input terminals 165, 166 energized from a balanceable impedance network 167. The control winding 157 of motor 156 has its energization leading the energization of winding 158 by 90 degrees or lagging the energization of winding 158 by 90 degrees depending upon the phase relationship of the control signal across terminals 165, 166 relative to the supply voltage across terminals 163, 164. The magnitude of the energizing current for winding 157 depends on the magnitude of the amplifier input signal. The motor speed below synchronous speed is proportional to the input current to winding 157. The motor speed is thus proportional to the magnitude of the voltage from potentiometer 23. The motor displaces slider 103 proportional to the time integral of the signal from potentiometer 23. The control motor amplifier-control motor combination may be similar to that disclosed in the patent to A. P. Upton 2,423,534, dated July 8, 1947.

The balanceable network for supplying a control voltage across terminals 165, 166 of amplifier 162 comprises control wheel torque signal generator 22, a velocity signal generator 168, and a control motor reset signal generator 169. It will be evident hereinafter from the forthcoming description that the reset signal generator 169 is not continuously in the balanceable network 167.

The impedance network 22 of Figure 1 has been supplemented in Figure 2 by a control wheel centering adjusting potentiometer 31 having an adjustable tap 33 connected to ground and a resistor 32 connected across the secondary winding 26 of transformer 27. Slider 33 may be manually adjusted so that there is no voltage output from the generator 22 with the control wheel 11 in its normal position. Velocity signal generator 168 comprises a secondary winding 170, a primary winding 171, a rotor 172, and a voltage dividing potentiometer 174. The primary winding is connected in series with a phasing capacitor 173 to the 400 cycle 115 volt supply. The secondary winding 170 is inductively related to the primary winding 171 by the rotor 172 which is driven from the control motor 156. The magnitude of the voltage induced in secondary winding 170 depends upon the speed of the rotor 172 and therefore of the motor 156. The phase of the voltage induced in winding 170 depends upon the direction of rotation of the rotor 172. The voltage dividing potentiometer 174 has a resistor 175 connected across the secondary winding 170 and an adjustable tap 176. The secondary winding 170, as stated, is inductively associated with the primary winding 171 by rotation of the rotor 172 and has a voltage induced in it dependent upon the magnitude and phase upon the speed and direction of rotation of rotor 172. With the rotor 172 stationary, no voltage is induced in the secondary winding 170. The velocity signal generator 168 is provided with a ground conductor 181 similar to the ground conductor 33 of signal generator 22 which thus has a common connection with amplifier ground conductor 182 extending from terminal 165. The outputs of the signal generator 22 and velocity signal generator 168 are applied to the balanceable network 167 in a parallel summing relation. Therefore a summing resistor 177 connects slider 24 of signal generator 22 with conductor 180 extending to amplifier terminal 166, and a summing resistor 178 connects slider 176 with conductor 180.

Reset signal generator 169 comprises a sector voltage balancing potentiometer 184 having a manually adjustable slider 186 connected to ground and a resistor 185; a secondary winding 187 of transformer 81; a variable resistance 188; and a sector switch comprising a pair of spaced contacts 191, 192 and a contactor 193 intermediate and separated from each of the contacts 191, 192. One end of resistor 185 is connected to secondary winding 187, and the other end of resistor 185 is connected through the variable resistor 188 to the remaining end of secondary winding 187. The secondary winding 187 has induced therein a low voltage with respect to the other voltages from the primary winding 82 and is thus a low voltage source. Contact 191 is connected to one end of secondary winding 187 and contact 192 is connected to the junction of resistors 185 and 188. Slider 193 is operatively positioned into engagement with contacts 191 or 192 by the operating means 155 extending from control motor 156. Slider 193 is connected to the balanceable network 167 of control motor amplifier 162 by a summing resistor 194. The variable resistor 188 controls the voltage across the sectors 192, 191 and the adjustable tap 186 may be adjusted so that equal voltages are obtained between slider 193 and slider 186 when the slider 193 engages either sector 191 or 192. Sectors 191 and 192 are of such length that the aircraft must exceed a five degree angle of bank when controlled from turn control network 100 before slider 193 passes beyond either sector 191 or 192.

Associated with the control motor operated means 155 is a directional gyro locking switch 196. The locking switch 196 comprises a pair of spaced contacts 197, 198 having an intermediate contactor 199 separated slightly therefrom. The contactor 199 is driven by the operating means 155.

The electrical circuit connection between the sector switch 196 and the directional gyro potentiometer locking means 153 is provided by a locking-automatic centering relay 200. The relay 200 comprises an operating winding 201 for relay arms 202, 203, and 204. Arm 202 coacts with an in contact 205 and an out contact 206; arm 203 coacts with an in contact 207 and an out contact 208; arm 204 coacts with an in contact 209 and an out contact 210. A conductor 212 extends from contactor 199 to arm 202, a conductor 213 extends from contact 197 to arm 203, and a conductor 214 extends from contact 198 to arm 204. A conductor 216 extends from in contact 54 of the aileron engage relay 44 to one end of operating winding 201 of relay 200 whose opposite end is connected to ground. Conductor 216 also is connected to in contacts 207 and 209 of relay 200. A conductor 218 extends from the in contact 205 of relay 200 to one end of operating winding 154 for the solenoid brake 153 the opposite end of winding 154 being connected to ground.

The operation of the device primarily from the standpoint of manual control from the pilot's control wheel 11 will now be considered. With the aircraft at the desired altitude and trimmed position and with the aileron and rudder control surfaces centered and considering networks 73, sliders 77, 88, 94, 103 will be at the center of their respective resistors. In network 119, sliders 123, 132 are at the centers of their respective resistors. The pilot may operate the single pole single throw switch 71 to complete a circuit from battery 70, through conductor 69, switch 71, relay winding 45, to ground, and return to battery ground conductor 217. The engage relay 44 is energized and its respective arms 46, 47, 48, and 49 move to their upward position in the figure. The brake windings of the aileron servomotor 43 which are internally connected to terminal 57 are energized from a circuit extending from battery 70, conductor 69, relay arm 48, in contact 53, terminal 57, both brake windings to ground and return to battery ground conductor 217. The aileron control surfaces are held by the energized brake windings as more fully evident from the patent to Hamby 2,466,702 against further movement by aerodynamic forces on the surface. In a similar manner, the rudder engage relay 112 may be energized to operatively engage the rudder servomotor 111 with the rudder control surface.

If the aircraft deviates from the heading being stabilized, the directional gyroscope 140 moves the slider 94 relative to resistor 93 so that a signal is generated between slider 94 and the center tap of secondary winding 95 in network 85. This voltage is applied both to networks 73 and 119 causing unbalance of the networks for the aileron amplifier 60 and the rudder amplifier 113. The amplifiers operate their respective servomotors 43 and 111 whereby the ailerons and rudder are operated. The servomotors operate their respective follow-up connections 72 and 123 to position sliders 77 and 123. The adjustment of slider 77 continues until the voltage between the slider 80 of the ratio potentiometer and the center tap of secondary winding 83 is equal and opposite to the signal from the adjustment of slider 94. Similarly the slider 123 is adjusted until the voltage between ratio potentiometer slider 127 and the center tap of secondary winding 124 is equal and opposite to the voltage generated from the adjustment of slider 94. Thus, the ailerons and rudder are operated through distances proportional to the change in heading.

As the craft banks in response to the operation of the ailerons, the vertical gyroscope 96 positions slider 88 in accordance with the changing bank attitude of the craft. A signal is thereby developed across resistor 90 due to the difference in potential between slider 88 and the center tap of secondary winding 95. This voltage is applied to networks 73 and 119 causing the servomotors to move their control surfaces back toward normal position. The bank attitude of the aircraft is thus made proportional to the deviation signal derived from the adjustment of slider 94. As the craft turns or changes heading due to the banked attitude and moves towards its original heading, the deviation signal decreases and slider 94 is moved back to its center position. This causes reverse operation of the ailerons and rudder so that the amount of bank of the aircraft is decreased. Eventually when the craft is again on the original heading the aileron and rudder control surfaces are returned to their normal position, and the aircraft resumes its original heading in an unbanked attitude.

With the aircraft thus stabilized on its heading by the directional gyroscope 140, the pilot may desire to manually change the heading of the craft. To this purpose, the pilot rotates the control wheel 11 in the direction in which the turn is to be made and applies a torque or effort proportional to the rate at which he desires the craft to turn. The operation of the control wheel 11 (Figure 1) adjusts the slider 24 relative to resistor 25 so that a signal is developed in signal generator 22. Referring to Figure 2, this signal is supplied through the summing resistor 177 in network 167 to the motor control amplifier 162. The input circuit being thus unbalanced, the amplifier 162 causes the control motor 156 to rotate in a direction to accord with the direction that the control wheel 11 was rotated. The motor 156 also drives the velocity signal generator 168. The energization of winding 157 is proportional to the unbalance signal applied to the amplifier 162. The speed of motor 156 increases as the energization of winding 157 increases within a speed range which is below the synchronous speed of motor 156. The speed of motor 156 increases until the velocity signal generator voltage selected by slider 176 and applied to summing resistor 178 and thereafter to network 167 approximately equals the voltage from signal generator 22. It will be appreciated that the manually operated generator 22 must also supply a sufficient signal so that the energization of winding 157 overcomes the friction of motor 156 and this required energization determines the excess of the signal from generator 22 over the velocity signal generator 168. Thus the motor 156 will be operated at a speed proportional to the signal from the manually operated generator 22 and hence in accordance with the torque exerted upon wheel 11.

Reverting to the operation of the manually operable engage switch 71, it is apparent that with the relay 44 energized a D. C. circuit is completed from battery 70, through conductor 69, relay arm 49, contact 54, conductor 216, through operating winding 201 of relay 200 to ground and return to battery ground 217. With winding 201 thus energized the relay 200 causes the arms 202, 203, 204 to move to operated position. As the motor 156 drives the velocity signal generator 168, it also through a gear train 179 operates the means 153 which adjusts slider 103 in network 100 and concomitantly adjusts the contactors 199 and 193. As contactor 199 engages contact 197, or 198, a circuit is completed from battery 70, switch arm 49, contact 54, conductor 216, relay in contact 207, relay arm 203, contact 197, contactor 199, conductor 212, relay arm 202, relay in contact 205, conductor 218, winding 154 of the solenoid brake 153, to ground and return to battery ground conductor 217. Alternatively the circuit may extend from energized conductor 216, relay in contact 209, relay arm 204, contact 198, contactor 199, conductor 212, relay in contact 205, conductor 218, winding 154 of the solenoid brake 153, to ground and return to battery ground conductor 217. With the brake 153 energized, the brake shoe 152 engages the periphery of driven member 151 of clutch 148 to hold it against further rotation.

As the operating means 155 of control motor 156 adjusts slider 103, it generates a signal in network 100 which is applied both to aileron network 73 and rudder network 119. The magnitude of signal from network 100 depends upon the rate of operation of motor 156 and its duration of operation. Further, the rate at which the signal from generator 102 is increasing depends upon the speed of motor 156 which speed is proportional to the effort exerted by the pilot on the control wheel 11. As the networks 73 and 119 are unbalanced from signal generator 100, the aileron amplifier 60 and the rudder amplifier 113 cause their respective servomotors 43 and 111 to position the ailerons and rudder. At the same time, the motors 43 and 111 operate through their follow-up connection 72 and 128, sliders 77 and 123 of the aileron and rudder rebalance potentiometers 75 and 121. The servomotors attempt to maintain their respective networks in balance condition at all times. If the difference between the voltage developed by turn control signal generator 100 is much larger than the voltage supplied from the rebalance potentiometer 75, the unbalance signal on aileron amplifier 60 for example will be large and thus the servomotor 43 will be continuously energized so that its extent of rotation in a given interval of time will be large. Thus if the rate at which slider 103 in network 100 is moved is large the servomotor 43 in order to balance this voltage by the adjustment of slider 77 will also have to rotate at a high rate or increase its displacement by a large amount in a given interval of time. Thus it will be seen that the rate at which the aileron and rudder control surfaces are displaced by their respective servomotors 43 and 111 depends upon the speed at which the control motor 156 moves slider 103. Since the control motor speed is dependent upon the amount of control wheel effort exerted by the pilot it is apparent that the rate at which the aileron and rudder control surfaces are moved depends upon the control wheel effort exerted by the pilot. Thus the control surfaces are moved by the power mechanism in the same manner as they would be directly by the pilot since their rate of operation depends upon the effort applied by the pilot to the control wheel. Furthermore in exerting the effort the reactive feel on the pilot gives him a sense of directly operating the control surfaces.

As the aircraft banks under the applied ailerons and rudder, the vertical gyro 96 as before puts in an opposing signal tending to return the operated ailerons and rudder to unoperated position. When the aircraft has attained a desired bank attitude which the pilot can ascertain from an indicating gyroscope, he releases his control effort on the wheel 11. The slider 24 is moved back to its center position on resister 25 by the operation of the spring member 14.

As the slider 24 returns to the center of resistor 25 the speed of motor 156 is reduced and the motor ultimately stops rotating with the slider 24 centered. The slider 103 in signal generator 100 remains as displaced. The signal from the vertical gyro bank potentiometer 86 opposes this voltage from network 100 so that network 73 is in balanced condition with the aileron servomotor 43 returned to its normal position and with slider 77 centered on resistor 76. In a similar manner the bank attitude voltage selected from network 85 by slider 91 and applied to rudder network 119 opposes the signal from network 100 and the rudder servo 111 also returns its slider 123 toward normal position.

To restore the craft to level attitude and prevent further turning due to its bank attitude, the pilot adjusts the control wheel 11 in the opposite direction thereby causing the motor 156 to rotate in a reverse direction. Slider 103 is thereby moved towards its center position. In networks 73 and 119, since the signal from the bank potentiometer 86 now exceeds that from signal generator 100, the aileron and rudder servomotors move their ailerons and rudders in the opposite directions tending to reduce the bank attitude of the aircraft and reduce its rate of turn.

When the aircraft is within five degrees of its normal level attitude about the roll axis which the pilot may note on the indicating gyroscope, the contactor 193 will be engaged with either contact 191 or 192. The pilot may now release his effort on the control wheel 11 even though slider 103 will not have been moved back entirely to its center position on resistor 102 and with slider 24 being centered on resistor 25. With the contactor 193 engaged with contact 191 a reset signal from generator 169 equal to the voltage between contact 191 and grounded tap 186 is transmitted by contactor 193, summing resistor 194, conductor 180 to network 167 of control motor amplifier 162. Thus while the manually operable generator 22 no longer supplies a signal to control motor 156, a reset signal is provided by generator 169 which continuously maintains the amplifier 162 energized until the motor 156 through the operating means 155 centers contactor 193 relative to contacts 191, 192. With the contactor 193 centered, the contactor 199 and slider 103 will also be centered.

With the slider 103 centered, the attitude of the aircraft is controlled primarily by vertical gyro bank potentiometer 86 which restores the craft to level position.

With contactor 199 centered relative to contacts 197 and 198, the circuit for energizing the brake operating winding 154 is broken, and brake shoe 152 becomes disengaged from driven clutch member 151. The directional gyroscope 140 is again rendered effective to operate slider 94 of the heading control potentiometer 92.

It will now be apparent that I have provided a novel pilot control wheel steering arrangement for an aircraft which functions through the automatic pilot of said craft to cause the operation of the ailerons and rudder thereof by its servomotors at a rate dependent upon the control wheel effort exerted by the pilot of said craft and to an extent depending upon the duration of such applied effort. As mentioned earlier, the operation of the control surfaces from the servomotors thuswise is similar to the operation thereof during direct manual operation and the reaction of the torque sensing member 14 gives the pilot such "feel" as if he were directly operating said surfaces.

While I have shown a preferred embodiment of my invention, it is understood that other arrangements may suggest themselves, to those skilled in the art, which do not depart from the spirit of my invention. Thus my invention is not to be restricted to the specific embodiment; it is to be limited only by the scope of the appendant claims.

I claim as my invention:

1. Control apparatus for an aircraft having control surfaces for changing the attitude of said craft, said apparatus comprising: a manually operable member, a first voltage generator comprising two parts and having one part positioned relative to the other part from said member, biasing means for returning said member to unoperated position connected between said two parts; motor means controlled by said generator and operating at a rate proportional to the force on said biasing means; a second displacement voltage generator operated by said motor means whose output varies at a rate proportional to the force on said biasing means; a control surface servomotor; a follow-up balanceable network operating said servomotor and controlled from said second generator; a mechanical follow-up operating connections from said servomotor to the second part of the first generator so that generator movement accompanies movement of the member; a craft attitude responsive device; and means in said network operated thereby for modifying the effect of said second generator to return said surfaces toward unoperated position.

2. Control apparatus for an aircraft, comprising: a servomotor means adapted to change craft attitude, a manually operable member; an elastic mechanical connection between said member and servomotor means; a signal generator operated on relative displacement of said member and servomotor means; a variable speed motor means controlled from said signal generator and operating at a rate dependent on the strain in said mechanical connection; a second generator actuated by displacement of said variable speed motor means; a third generator positioned by said servomotor means; a fourth signal generator positioned in accordance with changes in said attitude; and means controlled by said second, third, and fourth generators for operating said servomotor means so that craft attitude changes until said second and fourth generators produce equal effects on said servomotor means following release of said manually operable controller.

3. Control apparatus for an aircraft comprising: a servomotor means for altering craft attitude; a manually operable member; an elastic connection between said member and servomotor means; a first variable signal voltage generator operated in accordance with the strain in said elastic connection; variable speed, displaceable means including a second voltage generator adjusted at a rate dependent on the magnitude of the first signal voltage so that its voltage is proportional to a time integral of said first signal voltage; and servomotor operating means controlled by the second generator for operating said servomotor means for causing it to operate at a rate varying with the strain in said connection and feedback means for proportioning the servomotor displacement to the time integral signal.

4. Control apparatus for an aircraft comprising: a servomotor means for controlling the attitude of the craft about an axis; voltage responsive motor control means for operating said servomotor means; means responsive to change of attitude for producing a voltage varying with attitude change; means for producing an attitude control voltage; means for connecting said attitude change and attitude control voltage producing means to said motor control means; a manually operable member; a motor energizing means operatively connected to the manual member and servomotor means; and motor means connected to the energizing means and responsive to the differential position of said manual member and said servomotor means for adjusting said attitude control voltage.

5. Control apparatus for an aircraft comprising: a servomotor means for controlling the attitude of the craft about an axis; voltage responsive control means for operating said servomotor means; position maintaining means responsive to change of attitude for producing a voltage varying with attitude change; further means for producing an attitude control voltage; means for connecting both of said voltage producing means to said control means; a manually operable member; variable speed motor means connected to said further means for varying said attitude control voltage at an adjustable rate; a motor velocity signal producing device driven by said motor means; and signal providing means responsive to the differential position of said member and servomotor means and to said device for operating said variable speed motor means, for adjusting the rate of variation of the attitude control signal.

6. Apparatus for operating the ailerons of an aircraft comprising: servomotor means adapted to position said ailerons; bank attitude responsive means for producing a displacement voltage; bank attitude control adjustable displacement voltage producing means for varying said bank attitude; control means for said servomotor means operated by said voltages; a manually operable member; an elastic operating connection between said member and servomotor means; and further means including a variable speed motor responsive to the differential position of said member and servomotor means for controlling the rate of adjustment of said bank control adjustable means.

7. Apparatus for controlling the attitude of a dirigible craft comprising: an adjustable member; servomotor means; a voltage producing potentiometer means differentially adjusted by said member and servomotor means according to their relative displacements; a motor; a motor velocity voltage generator driven by said motor and having an output voltage proportional to said motor speed; means connected to said potentiometer and generator whereby said two voltages are opposed for operating said motor at a speed proportional to said potentiometer signal voltage; a voltage generator operated by displacement of said motor whose output varies with the time integral of motor speed; a bank attitude voltage generator; means controlled by said integral voltage and bank attitude voltage for operating said servomotor means; and means driven by said servomotor means for controlling the bank attitude of the craft.

8. Control apparatus for an aircraft having aileron control surfaces, said apparatus comprising: a manually operable member; a servomotor means for operating said ailerons; an elastic connection between said member and servomotor means; a potentiometer between said member and servomotor means for producing a voltage varying with their differential position; further means including a variable speed motor controlled by said potentiometer for producing a displacement voltage that is the integral of said potentiometer voltage; and a follow-up network controlled by said further means for operating said servomotor means so that the aileron operation rate varies with the strain in said elastic connection.

9. Control apparatus for an aircraft comprising: a servomotor adapted to change the attitude of said craft about an axis; a balanceable network for controlling said servomotor; an attitude responsive signal generator, a servomotor driven signal generator, and an attitude control signal generator included in said network; a manually operable signal generator biased to non-signal generating position; a variable speed motor having a normal position and a displacement position controlled in accordance with a time integral of said manual signal generator output for adjusting said attitude control signal generator; a further signal generator adjusted with said attitude control signal generator; and switch means effective on return of said variable speed motor toward normal position and release of said manual signal generator for controlling said variable speed motor from said further signal generator whereby said attitude responsive generator controls craft attitude.

10. Apparatus for controlling the attitude of a dirigible craft comprising: an adjustable member; servomotor means; a signal voltage producing potentiometer means differentially adjusted by said member and servomotor means; a control motor; a velocity signal voltage generator driven by said control motor and having an output proportional to the speed of said control motor; means connected to said potentiometer and generator for operating said control motor at a speed proportional to said potentiometer voltage; a voltage generator operated by displacement of said control motor whose output varies with the time integral of motor speed; a bank attitude signal voltage generator; means controlled by said integral voltage generator and bank attitude voltage generator for operating said servomotor means; biasing means for said potentiometer between said adjustable member and servomotor means; a reset voltage generator having control motor circuit elements operated with said integral generator by said control motor; and switch means effective upon release of said adjustable member for controlling said control motor from said reset voltage generator whereby said bank attitude generator controls return of said craft to its original attitude.

11. Apparatus for controlling a condition including a condition control device, said apparatus comprising: an adjustable member; servomotor means adapted to operate said device; a voltage producing potentiometer means differentially adjusted by said member and servomotor means; a control motor; a velocity signal voltage generator driven by said control motor and having an output proportional to the speed of said control motor; means connected to said potentiometer and velocity generator for opposing the two voltages for operating said control motor at a speed proportional to the magnitude of said potentiometer voltage; a second potentiometer operated by displacement of said control motor to supply a displacement voltage whose output varies with the time integral of control motor speed; a condition responsive voltage generator; means controlled by said integral voltage and condition responsive voltage for operating said servomotor means; biasing means for said first potentiometer between said adjustable member and servomotor means; a displaceable control motor circuit element of said reset voltage generator operated with said integral voltage generator by said control motor; and switch means effective upon release of said adjustable member and return thereof to unoperated position by said biasing means for controlling said control motor from said reset voltage generator to reduce said integral voltage whereby said condition responsive generator controls said device to restore said condition.

12. An apparatus for controlling a condition and having a condition controlling device, in combination: a servomotor adapted to operate said condition controlling device; a balanceable network for controlling said servomotor; a condition responsive means operated control signal generator, a servomotor driven control signal generator, and a selected condition control signal generator included in said network; a manually operable control signal generator biased to non-signal generating position; a variable speed control motor having a normal position and a displacement position controlled in accordance with a time integral of the magnitude of said manual signal for adjusting said selected condition control generator; a further reset signal generator adjusted with said selected condition control signal generator; and switch means effective on return of said control motor toward normal position and release of said control manual signal generator for controlling said control motor from said further generator whereby said condition responsive generator restores said condition.

13. Control apparatus for an aircraft having a control surface for changing craft attitude, said apparatus comprising: a manually operable member; a servomotor; means including an elastic connection arranged between said member and servomotor for generating a control signal proportional to the effort applied to said manual member, means including a variable speed motor connected for response to the control signal for obtaining a second motor displacement signal which is a time integral of said first signal, a craft attitude responsive signal generator; and variable speed control means operated by said integral signal and said attitude signal for controlling said servomotor so that said surface operation rate is proportional to the applied effort.

14. Control apparatus for an aircraft having a control surface for changing craft attitude, said apparatus comprising: a servomotor adapted to operate said surface; variable speed control means for reversibly operating said servomotor; a manually operable signal generator having two relatively displaceable parts, one part solely positioned by said servomotor, the other resiliently supported between a craft control column and a servomotor driven member for developing a control signal proportional to the manual effort applied to said column; means for obtaining a time integral signal of said manual signal, a follow-up control signal generator driven by said servomotor; and means for applying the integral and follow-up signals in opposition to said control means so that said control surface is operated at a rate proportional to the difference of said control signals.

15. Control apparatus for an aircraft having a control surface for changing craft attitude and having a conventional control column, said apparatus comprising: a servomotor adapted to operate said surface; variable speed motor control means for reversibly operating said servomotor; a signal generator comprising two relatively displaceable parts, one part solely positioned by said servomotor, the other resiliently differentially positioned from the craft control column and said servomotor for developing a control signal proportional to the manual effort applied to the column; variable speed means controlled from said generator for obtaining by its displacement a time integral signal of said manual signal, a follow-up control signal generator driven by said servomotor; a craft attitude control signal generator; and means for applying said integral, follow-up, and attitude signals to said motor control means whereby said integral signal balances said attitude signal with said surface restored to unoperated position on removal of said manual effort.

16. In a control system for operating a control surface of an aircraft, a servomotor adapted to operate said surface, a manually operable member, an elastic connection between said member and servomotor, a first electric voltage signal generator operated by said connection and positioned in accordance with the magnitude of the deformation of said connection, a second voltage signal generator driven by said servomotor in proportion to its displacement, means connected to said first signal generator for providing a third signal which has a magnitude that is a time integral of said deformation signal, and means responsive to said integral signal and said follow-up signal for operating said servomotor.

17. A condition control apparatus for actuating a condition controlling device to establish a new condition at a rate proportional to the effort applied to a manually operable member comprising: a servomotor adapted to move variable distances in a given period depending on its energization and adapted to operate said condition controlling device; an elastic connection between said manual member and said servomotor; means operated by said connection for generating a first displacement control signal in accordance with the deformation of said elastic connection; means responsive to said first signal for obtaining a time integral signal of said deformation signal; a condition responsive operated control signal generator; a variable speed servomotor control signal responsive means for operating said servomotor at a rate proportional to an applied signal; and means for connecting said integral signal and said condition responsive signal in opposition to said control signal responsive means whereby on removal of said effort said condition responsive signal balances said integral signal to maintain the condition attained.

18. Control apparatus for a control surface of an aircraft, said apparatus comprising: a servomotor adapted to position said surface; a manually operable member; resilient means for interconnecting said manual member and servomotor; signal-providing means having one part positioned by said servomotor and another part supported by said resilient means for generating a first control signal proportional to the effort applied to said manual member; variable speed displaceable means controlled by the first signal for obtaining by its displacement a second signal which is a time integral of said first signal; a craft attitude signal generator; a follow-up signal generator driven by said servomotor; variable speed control means for reversibly operating said servomotor; and means for connecting said integral, said craft attitude, and said follow-up signals to said control means.

19. Control apparatus for an aircraft, comprising: a servomotor means adapted to change craft attitude; a manually operable member; an elastic mechanical connection between said member and servomotor means; a signal generator operated on relative displacement of said member and servomotor means; a variable speed motor means controlled from said signal generator; a velocity signal generator driven by the variable speed motor means and opposing said signal generator in said variable speed motor means and thus causing the variable speed motor means to operate at a rate dependent on the strain in said mechanical connection; a displaceable follow-up controller for operating said servomotor means; and means for operating said follow-up controller from said variable speed motor means to operate said servomotor means at a rate proportional to said strain.

20. Control apparatus for an aircraft having aileron surfaces for controlling craft heading; said apparatus comprising: a heading change effecting control voltage generator biased to non-voltage generating position; a heading responsive voltage generator; a control motor operated by said heading change effecting control voltage generator; a manual member for operating said heading change effecting control voltage generator; a reset generator having circuit connecting elements driven from said control motor; a control motor operated voltage generator; a balanceable controller including said heading responsive generator and control motor operated generator; an aileron servomotor controlled by said balanceable controller and in turn operating through a mechanical connection said balanceable controller to rebalance the same; a bank attitude device for further adjusting said balanceable controller; means driven by said control motor on departure thereof from a normal position for disabling said heading responsive generator; and means operated on return of said control motor toward normal position for connecting said reset generator to said control motor whereby upon release of said manual member, said bank attitude device returns said craft to its original attitude.

References Cited in the file of this patent
UNITED STATES PATENTS

| | | |
|---|---|---|
| 1,966,170 | Greene | July 10, 1934 |
| 2,429,642 | Newton | Oct. 28, 1947 |
| 2,450,907 | Newton | Oct. 12, 1948 |
| 2,451,263 | Webb | Oct. 12, 1948 |
| 2,511,846 | Halpert | June 20, 1950 |
| 2,533,597 | Maroni | May 22, 1951 |
| 2,582,305 | Young | Jan. 15, 1952 |
| 2,586,034 | Halpert | Feb. 19, 1952 |